(12) United States Patent
Saka et al.

(10) Patent No.: US 10,115,959 B2
(45) Date of Patent: Oct. 30, 2018

(54) METHOD OF MANUFACTURING NON-AQUEOUS LIQUID ELECTROLYTE SECONDARY BATTERY

(71) Applicant: TOYOTA JIDOSHA KABUSHIKI KAISHA, Toyota-shi, Aichi-ken (JP)

(72) Inventors: Hideyuki Saka, Toyota (JP); Yukihiro Okada, Shijyonawate (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 25 days.

(21) Appl. No.: 15/242,753

(22) Filed: Aug. 22, 2016

(65) Prior Publication Data

US 2017/0069906 A1    Mar. 9, 2017

(30) Foreign Application Priority Data

Sep. 8, 2015 (JP) .................. 2015-176727

(51) Int. Cl.

| | |
|---|---|
| *B05D 5/12* | (2006.01) |
| *H01M 4/04* | (2006.01) |
| *H01M 4/485* | (2010.01) |
| *H01M 4/62* | (2006.01) |
| *H01M 4/131* | (2010.01) |
| *H01M 4/1391* | (2010.01) |
| *H01M 10/42* | (2006.01) |
| *H01M 10/0525* | (2010.01) |

(Continued)

(52) U.S. Cl.
CPC ......... *H01M 4/0404* (2013.01); *H01M 4/131* (2013.01); *H01M 4/1391* (2013.01); *H01M 4/485* (2013.01); *H01M 4/62* (2013.01); *H01M 10/4235* (2013.01); *H01M 4/525* (2013.01); *H01M 10/0525* (2013.01); *H01M 2004/028* (2013.01)

(58) Field of Classification Search
CPC ....................................................... H01M 4/131
See application file for complete search history.

(56) References Cited

U.S. PATENT DOCUMENTS

| | | | |
|---|---|---|---|
| 2008/0020287 A1* | 1/2008 | Cho ................... | H01M 10/0567 429/339 |
| 2011/0059356 A1 | 3/2011 | Ogasawara et al. | |
| 2017/0104205 A1* | 4/2017 | Ishii ................... | H01M 4/0433 |

FOREIGN PATENT DOCUMENTS

| | | |
|---|---|---|
| CN | 101512822 A | 8/2009 |
| JP | 2011-77016 A | 4/2011 |

(Continued)

*Primary Examiner* — Austin Murata
(74) *Attorney, Agent, or Firm* — Sughrue Mion, PLLC (57) ABSTRACT

A method of manufacturing a non-aqueous liquid electrolyte secondary battery is to manufacture a non-aqueous liquid electrolyte secondary battery including a positive electrode mixture layer containing a lithium-containing transition metal oxide as a positive electrode active material. The manufacturing method includes: mixing the positive electrode active material and an aromatic nitrile compound such that a mass ratio of the aromatic nitrile compound to the positive electrode active material is not less than 0.1% by mass and not more than 4% by mass, to prepare a mixture; mixing the mixture, a conductive material, a binder, and a solvent to prepare a granular body; and disposing the granular body on a surface of a positive electrode collector to form at least a part of the positive electrode mixture layer.

4 Claims, 7 Drawing Sheets

(51) Int. Cl.
*H01M 4/02* (2006.01)
*H01M 4/525* (2010.01)

(56) References Cited

FOREIGN PATENT DOCUMENTS

WO 2008/004790 A1 1/2008
WO 2014/185365 A1 11/2014

* cited by examiner

METHOD OF MANUFACTURING NON-AQUEOUS LIQUID ELECTROLYTE SECONDARY BATTERY

This nonprovisional application is based on Japanese Patent Application No. 2015-176727 filed on Sep. 8, 2015, with the Japan Patent Office, the entire contents of which are hereby incorporated by reference.

BACKGROUND OF THE INVENTION

Field of the Invention

The present invention relates to a method of manufacturing a non-aqueous liquid electrolyte secondary battery.

Description of the Background Art

Japanese Patent Laying-Open No. 2011-77016 discloses a technique of adding adiponitrile to a liquid electrolyte for forming a coating film originating from this adiponitrile on the surface of a positive electrode active material.

SUMMARY OF THE INVENTION

For example, lithium (Li)-containing transition metal oxide represented by $LiCoO_2$ and the like is known as a positive electrode active material for a non-aqueous liquid electrolyte secondary battery. In the Li-containing transition metal oxide, Li ions (guests) can be reversibly intercalated into a space in its crystal structure (host structure).

In the Li-containing transition metal oxide, transition metal constituting a host structure is subjected to oxidation-reduction in accordance with charge/discharge of the battery. In other words, during charging, transition metal in the low oxidation state (for example, $Co^{3+}$) emits electrons and turns into a high oxidation state (for example, $Co^{4+}$). During discharging, transition metal in the high oxidation state receives electrons and turns into a low oxidation state.

The crystal structure of the Li-containing transition metal oxide becomes more unstable as the transition metal turns into a higher oxidation state. Accordingly, transition metal in the Li-containing transition metal oxide may elute into a liquid electrolyte, for example, in use-applications such as a high temperature cycle. The transition metal eluted into the liquid electrolyte moves toward a negative electrode, and precipitates on the negative electrode. It is considered that such precipitation of transition metal on the negative electrode inhibits movement of Li ions, thereby leading to a resistance increase.

According to PTD 1, an aliphatic nitrile compound such as adiponitrile is added to a liquid electrolyte, thereby forming a coating film on the surface of the positive electrode active material, so that elution of transition metal can be suppressed. This effect cannot however be regarded as sufficient.

The present invention has been made in light of the above-described problems. An object of the present invention is to provide a method of manufacturing a non-aqueous liquid electrolyte secondary battery, in which an effect of suppressing elution of transition metal contained in a positive electrode active material is improved.

[1] A method of manufacturing a non-aqueous liquid electrolyte secondary battery is to manufacture a non-aqueous liquid electrolyte secondary battery including a positive electrode mixture layer containing a lithium-containing transition metal oxide as a positive electrode active material. The method includes: mixing the positive electrode active material and an aromatic nitrile compound such that a mass ratio of the aromatic nitrile compound to the positive electrode active material is not less than 0.1% by mass and not more than 4% by mass, to prepare a mixture; mixing the mixture, a conductive material, a binder, and a solvent to prepare a granular body; and disposing the granular body on a surface of a positive electrode collector to form at least a part of the positive electrode mixture layer.

Generally, the positive electrode mixture layer of the non-aqueous liquid electrolyte secondary battery contains various components such as a conductive material and a binder in addition to a positive electrode active material. As disclosed in PTD 1, in the case where a nitrile compound is added to a liquid electrolyte, a coating film originating from this nitrile compound adheres also to components other than the positive electrode active material. In other words, it is considered that the coating film cannot be selectively disposed on the surface of the positive electrode active material, so that the elution suppressing effect by this coating film cannot be sufficiently achieved.

In the manufacturing method of [1] described above, a positive electrode active material and an aromatic nitrile compound are mixed in advance, thereby causing the aromatic nitrile compound to directly adhere onto the surface of the positive electrode active material. In the manufacturing method of [1] described above, after this operation, a conductive material, a binder and the like are added to prepare a granular body.

A granular body is a collection of granular particles (composite particles) containing a positive electrode active material, a binder and the like. This granular body is for example formed into a sheet shape by roll forming, and then disposed on a positive electrode collector, with the result that a positive electrode mixture layer can be formed. According to the conventionally used method of forming a positive electrode mixture layer, generally, a positive electrode active material, a binder and the like are dispersed into a large amount of solvent, to form a coating material (which is also referred to as a "paste", "slurry" or the like), which is then coated on the positive electrode collector. According to this method, however, an aromatic nitrile compound flows down from the surface of the positive electrode active material in the process of forming a coating material. This is because the positive electrode active material is stirred in a large amount of solvent.

As compared with such a coating material, the granular body can be formed with a relatively smaller amount of solvent. Thus, according to the manufacturing method of [1] described above, a positive electrode mixture layer can be formed while maintaining the state where an aromatic nitrile compound is selectively disposed on the surface of the positive electrode active material. It is considered that this allows formation of a uniform coating film, which originates from an aromatic nitrile compound, on the surface of the positive electrode active material, for example, during initial charge/discharge.

Furthermore, in the manufacturing method of [1] described above, an aromatic nitrile compound is used as a nitrile compound. It is considered that elution of transition metal is caused by transmission and reception of electrons on the surface of the positive electrode active material. It is considered that the aromatic nitrile compound shows electron donicity on the surface of the positive electrode active material. Accordingly, a coating film originating from an aromatic nitrile compound is uniformly formed on the surface of the positive electrode active material, thereby causing transmission and reception of electrons to occur in this coating film. It is considered that this can suppress elution of transition metal.

It is to be noted that the mass ratio of the aromatic nitrile compound to the positive electrode active material is not less than 0.1% by mass and not more than 4% by mass. In the manufacturing method of [1] described above, the aromatic nitrile compound is selectively disposed on the surface of the positive electrode active material, so that a sufficient elution suppressing effect can be achieved by addition of 0.1% by mass. However, when the mass ratio of the aromatic nitrile compound exceeds 4% by mass, the coating film originating from the aromatic nitrile compound reacts also to excessive Li ions, so that the battery capacity may greatly decrease. Also, the thickly formed coating film may cause a resistance increase.

In the manufacturing method of [1] described above, a granular body containing an aromatic nitrile compound may be used to form an entire positive electrode mixture layer or form a part of the positive electrode mixture layer.

[2] In the manufacturing method of [1] described above, it is preferable that the positive electrode mixture layer is formed as described below. The positive electrode mixture layer is formed so as to extend along the surface of the positive electrode collector in a longitudinal direction. In a width direction orthogonal to the longitudinal direction, the positive electrode mixture layer includes a center portion, and a first end and a second end with the center portion interposed therebetween. The center portion does not contain the aromatic nitrile compound. The first end and the second end each contain the granular body. In a case where a total width of the positive electrode mixture layer is defined as W0, a width of the first end is defined as W1 and a width of the second end is defined as W2, the positive electrode mixture layer is formed so as to satisfy the following equation (I):

$$0.33\% \leq \{(W1+W2)/W0\} \times 100 \leq 9.56\% \quad (I)$$

Transition metal remarkably elutes on both ends (the first end and the second end) of the positive electrode mixture layer in the width direction. Generally, the non-aqueous liquid electrolyte secondary battery is designed such that the negative electrode mixture layer is greater in area than the positive electrode mixture layer, and the entire surface of the positive electrode mixture layer faces the negative electrode mixture layer. In this case, a portion of the negative electrode mixture layer that faces the positive electrode mixture layer will be referred to as a "facing portion" while an extra portion of the negative electrode mixture layer that does not face the positive electrode mixture layer will be referred to as a "non-facing portion".

Since the non-facing portion does not face the positive electrode mixture layer, it does not directly receive Li ions from the positive electrode mixture layer. However, since Li ions diffuse into the negative electrode mixture layer, Li ions may diffuse from the facing portion toward the non-facing portion. Therefore, the amount of Li ions to be supplied to the negative electrode mixture layer is larger on both ends of the positive electrode mixture layer located adjacent to the non-facing portion than in the center portion of the positive electrode mixture layer. Accordingly, it is considered that the positive electrode potential is likely to rise and elution of transition metal is likely to occur more on both ends of the positive electrode mixture layer than in the center portion of the positive electrode mixture layer.

When elution of transition metal occurs locally on both ends of the positive electrode mixture layer, resistance may increase and Li may locally precipitate on both ends of the negative electrode mixture layer facing this positive electrode mixture layer.

In the manufacturing method of [2] described above, a granular body containing an aromatic nitrile compound is locally disposed on each of both ends (that is, the first end and the second end) of the positive electrode mixture layer. The center portion does not contain an aromatic nitrile compound. Thereby, elution of transition metal can be efficiently suppressed while minimizing adverse effects (for example, a capacity decrease and the like) caused by addition of an aromatic nitrile compound.

As shown in the above-described equation (I), the width ratio (percentage) of both ends at which granular bodies each containing an aromatic nitrile compound are disposed is preferably not less than 0.33% and not more than 9.56% relative to the total width of the positive electrode mixture layer. This is because the above-mentioned range can enhance a transition metal elution suppressing effect, and also can suppress a capacity decrease and a resistance increase.

In addition, the center portion may, for example, be formed of a granular body not containing an aromatic nitrile compound, or be formed by coating a paste not containing an aromatic nitrile compound.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An example of an embodiment of the present invention (hereinafter referred to as the "present embodiment") will be hereinafter described. However, the present embodiment is not limited to the following description. In the following description, a non-aqueous liquid electrolyte secondary battery may be simply referred to as a "battery".

<Method of Manufacturing Non-Aqueous Liquid Electrolyte Secondary Battery>

Figure 1:
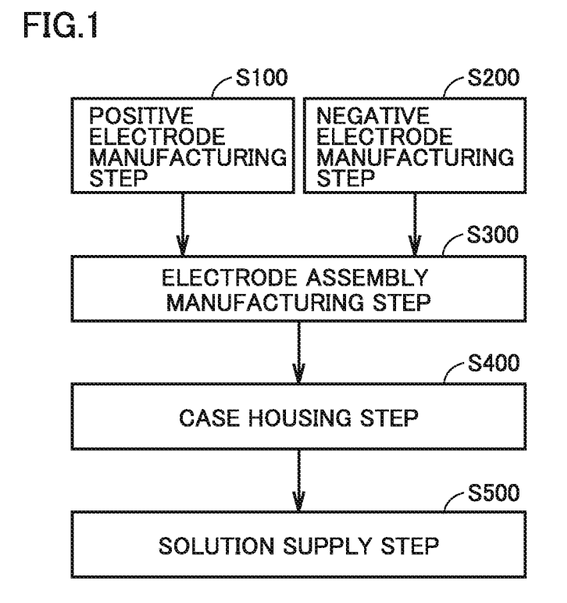
FIG. 1 is a flowchart illustrating an outline of a method of manufacturing a non-aqueous liquid electrolyte secondary battery according to an embodiment of the present invention.

A method of manufacturing a non-aqueous liquid electrolyte secondary battery of the present embodiment is to manufacture a non-aqueous liquid electrolyte secondary battery including a positive electrode mixture layer containing a lithium-containing transition metal oxide as a positive electrode active material. FIG. 1 is a flowchart showing an outline of a method of manufacturing a non-aqueous liquid electrolyte secondary battery of the present embodiment.

The method of manufacturing a non-aqueous liquid electrolyte secondary battery includes a positive electrode manufacturing step (S100), a negative electrode manufacturing step (S200), an electrode assembly manufacturing step (S300), a case housing step (S400), and a solution supply step (S500). Each of the steps will be hereinafter described.

<<Positive Electrode Manufacturing Step (S100)>>

Figure 4:
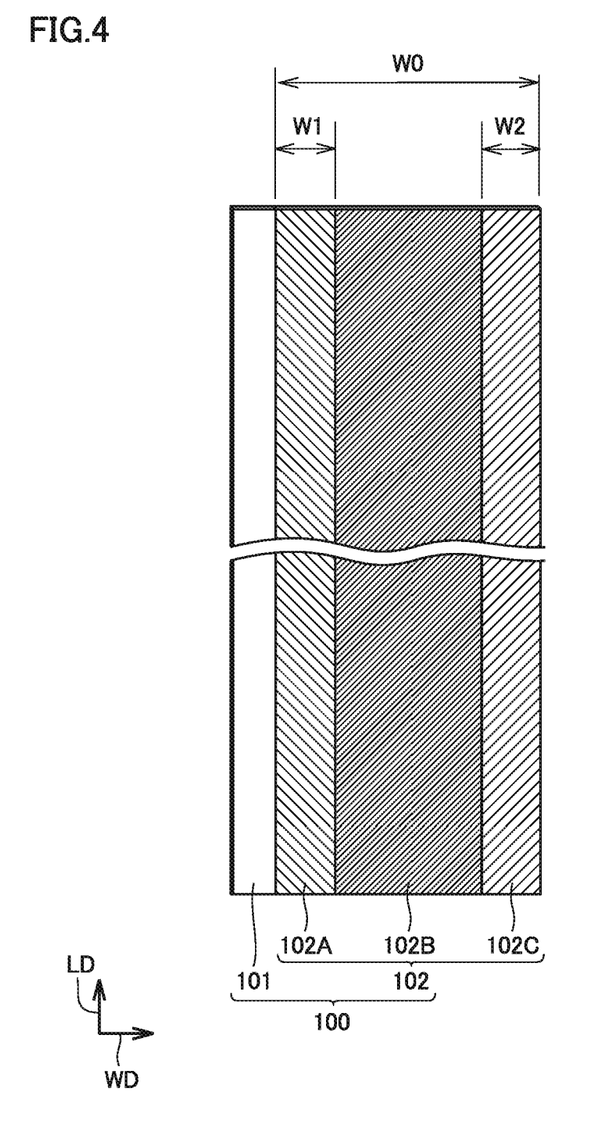
FIG. 4 is a schematic diagram showing an example of the configuration of a positive electrode.

In the positive electrode manufacturing step, for example, a positive electrode 100 shown in FIG. 4 is manufactured.

Figure 2:
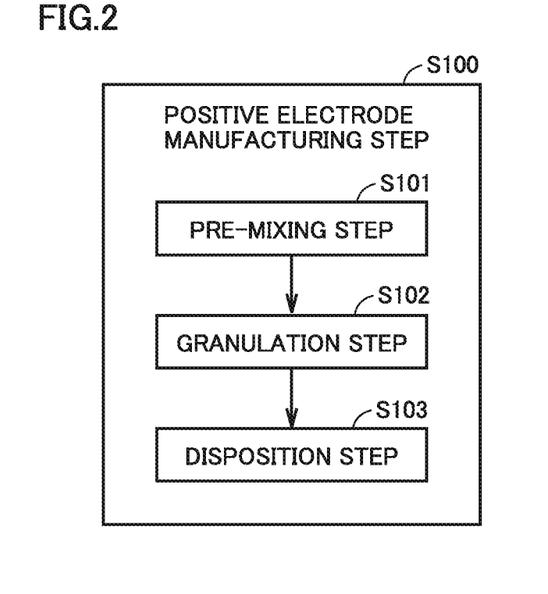
FIG. 2 is a flowchart illustrating an outline of a positive electrode manufacturing step.

FIG. 2 is a flowchart illustrating an outline of the positive electrode manufacturing step. As shown in FIG. 2, the positive electrode manufacturing step includes a pre-mixing step (S101), a granulation step (S102), and a disposition step (S103). In other words, the method of manufacturing a non-aqueous liquid electrolyte secondary battery includes a pre-mixing step, a granulation step and a disposition step. The pre-mixing step, the granulation step and the disposition step are performed in this order.

<<Pre-Mixing Step (S101)>>

In the pre-mixing step, a positive electrode active material and an aromatic nitrile compound are mixed to thereby prepare a mixture.

(Positive Electrode Active Material)

In the present embodiment, Li-containing transition metal oxide is used as a positive electrode active material. The Li-containing transition metal oxide contains a transition metal atom and an oxygen atom that constitute a host structure, and a Li ion as a guest. The host structure may have, for example, a layered rock-salt structure, a spinel-type structure, an olivine-type structure, and the like. The Li-containing transition metal oxide can, for example, be $LiCoO_2$, $LiNiO_2$, a compound expressed by the general formula $LiNi_aCo_bO_2$ (wherein a+b=1, 0<a<1, and 0<b<1), $LiMnO_2$, $LiMn_2O_4$, a compound expressed by the general formula $LiNi_aCo_bMn_cO_2$ (wherein a+b+c=1, 0<a<1, 0<b<1, and 0<c<1) (for example, $LiNi_{1/3}Co_{1/3}Mn_{1/3}O_2$ and the like), $LiFePO_4$, and the like. The Li-containing transition metal oxide may be used alone, or two or more types of Li-containing transition metal oxides may be used in combination.

The Li-containing transition metal oxide contains, as an additional element, for example, magnesium (Mg), aluminum (Al), silicon (Si), potassium (K), calcium (Ca), titanium (Ti), vanadium (V), chromium (Cr), iron (Fe), gallium (Ga), germanium (Ge), rubidium (Rb), strontium (Sr), zirconium (Zr), niobium (Nb), molybdenum (Mo), tungsten (W), and the like. Elution of transition metal may be able to be suppressed by substituting a part of the host structure for the above-mentioned elements. Particularly, it is preferable that the additional element is at least one type selected from the group consisting of Zr, Ti, Mg, and W. The additional amount may be about 0.01 mol % to 1.0 mol %, for example. The additional element may be dissolved in the Li-containing transition metal oxide, or may only be supported on the surface of the Li-containing transition metal oxide.

(Aromatic Nitrile Compound)

The aromatic nitrile compound may be a liquid or may be a solid (powder). It is considered that the aromatic nitrile compound and the coating film originating therefrom exhibit electron donicity on the surface of the positive electrode active material and suppress elution of transition metal. The aromatic nitrile compound of the present embodiment is a compound expressed by the following chemical formula (i):

$$Ar-(CN)_n \qquad (i)$$

In the above-described chemical formula (i), Ar represents an aromatic group (aryl group) that may be substituted. (CN) represents a nitrile group, and n is an integer equal to or greater than 1. In other words, the aromatic nitrile compound may contain a plurality of nitrile groups. The nitrile group may be directly coupled to an aromatic group or may be coupled to a substituent (for example, an alkyl group and the like) coupled to an aromatic group.

The aromatic group may be an aromatic hydrocarbon group or may be an aromatic heterocycle group. Examples of the aromatic hydrocarbon group may be a phenyl group, a naphthyl group, an anthranil group, and the like. Examples of the aromatic heterocycle group may be a furyl group, a pyridinyl group, a thienyl group, a quinolyl group, an indolyl group, and the like.

As long as the aromatic nitrile compound has at least one nitrile group, this aromatic nitrile compound may have, other than a nitrile group, a substituent coupled to an aromatic group. Such a substituent may, for example, be a linear-chain or branched alkyl group having a carbon number of 1 to 10, a halogen atom, a carboxy group, a linear-chain or branched alkoxy group having a carbon number of 1 to 10, a nitro group, and the like.

Specific examples of an aromatic nitrile compound may be benzonitrile, 2-methylbenzonitrile, 3-methylbenzonitrile, 4-methylbenzonitrile, 4-fluoro-3-methylbenzonitrile, and the like. The aromatic nitrile compound may be used alone, or two or more types of aromatic nitrile compounds may be used in combination.

A commonly-used mixing apparatus, stirring apparatus, granulator, and the like can be used for the operation of mixing a positive electrode active material and an aromatic nitrile compound. For example, a planetary mixer, a high-speed mixer (manufactured by Earth Technica Co., Ltd.), and the like can be used.

As a specific operation, for example, a prescribed amount of positive electrode active material and aromatic nitrile compound are introduced into a mixing vessel of a mixing apparatus, and the introduced material and compound are stirred and mixed, so that a mixture can be prepared. The rotation speed, mixing time and the like of the stirring blade can be suitably changed in accordance with the throughput or the like. In this case, the positive electrode active material and the aromatic nitrile compound are mixed such that the mass ratio of the aromatic nitrile compound to the positive electrode active material is not less than 0.1% by mass and not more than 4% by mass. Studies conducted by the present inventors have verified that sufficient effects can be achieved when the mass ratio is 0.1% by mass. Also, when this mass ratio exceeds 4% by mass, a battery capacity decrease, a resistance increase and the like may be caused. The mass ratio may, for example, be not less than 0.1% by mass and not more than 2% by mass, or may be not less than 2% by mass and not more than 4% by mass as long as it is not less than 0.1% by mass and not more than 4% by mass.

<<Granulation Step (S102)>>

In the granulation step, the mixture obtained in the pre-mixing step, the conductive material, the binder, and the solvent are mixed, thereby preparing a granular body. The granulation step can be performed subsequent to the pre-mixing step within the mixing apparatus used in the pre-mixing step.

For example, after the mixture is prepared within the mixing vessel of the mixing apparatus, an conductive material, a binder and a solvent are additionally introduced into the mixing vessel, and stirred and mixed, so that a granular body can be prepared. The solid content of the granular body is prepared so as to contain, for example, about 80% by mass to 98% by mass of positive electrode active material. The solid content used herein shows a component other than the solvent in the mixture (a granular body and the like). The solid content of the granular body will constitute a positive electrode mixture layer.

(Conductive Material)

The solid content of the granular body is prepared so as to contain, for example, about 1% by mass to 10% by mass of conductive material. The conductive material is not particularly limited. The conductive material may be carbon blacks such as acetylene black and thermal black, for example. Alternatively, the conductive material may be graphite and the like.

(Binder)

The solid content of the granular body is prepared so as to contain, for example, about 1% by mass to 10% by mass of binder. The binder is not particularly limited. The binder may, for example, be polyvinylidene difluoride (PVDF), polytetrafluoroethylene (PTFE), and the like. Alternatively, the binder may be a copolymer made of: a monomer such as vinylidene fluoride (VDF) and tetrafluoroethylene (TFE); and other monomers. The monomer that can be copolymerized with VDF or TFE may, for example, be hexafluoropropylene (HFP), ethylene, perfluoro (alkyl vinyl ether), and the like. The copolymers may be an alternating copolymer, a random copolymer, a graft copolymer, a block copolymer, and the like.

(Solvent)

The solvent can be suitably selected in accordance with the binder and the like. Examples of the solvent can be N-methyl-2-pyrrolidone (NMP), dimethylformamide (DMF), dimethyl sulfoxide (DMSO), isopropyl alcohol (IPA), water, and the like.

The amount of the solvent to be used is set such that the mixture does not turn into a coating material but compositing (granulation) occurs due to prescribed particle aggregation. The solvent is prepared such that the solid content ratio of the granular body is set at 70% by mass to 80% by mass, for example. The solid content ratio used herein shows the mass ratio of the components other than the solvent in the mixture (a granular body or the like).

<<Disposition Step (S103)>>

In the disposition step, a granular body is disposed on the surface of the positive electrode collector, thereby forming at least a part of the positive electrode mixture layer. In the disposition step, a granular body may be used to form an entire positive electrode mixture layer, or to form a part of the positive electrode mixture layer. By way of example, an explanation will be given in the following description with regard to the manner in which a granular body containing an aromatic nitrile compound is disposed on each of both ends of the positive electrode mixture layer in the width direction. In the following description, for the sake of convenience, the granular body containing an aromatic nitrile compound will be referred to as the "first granular body" and the granular body not containing an aromatic nitrile compound is referred to as the "second granular body". The second granular body can be prepared in the same manner as for the first granular body except that an aromatic nitrile compound is not added.

Figure 3:
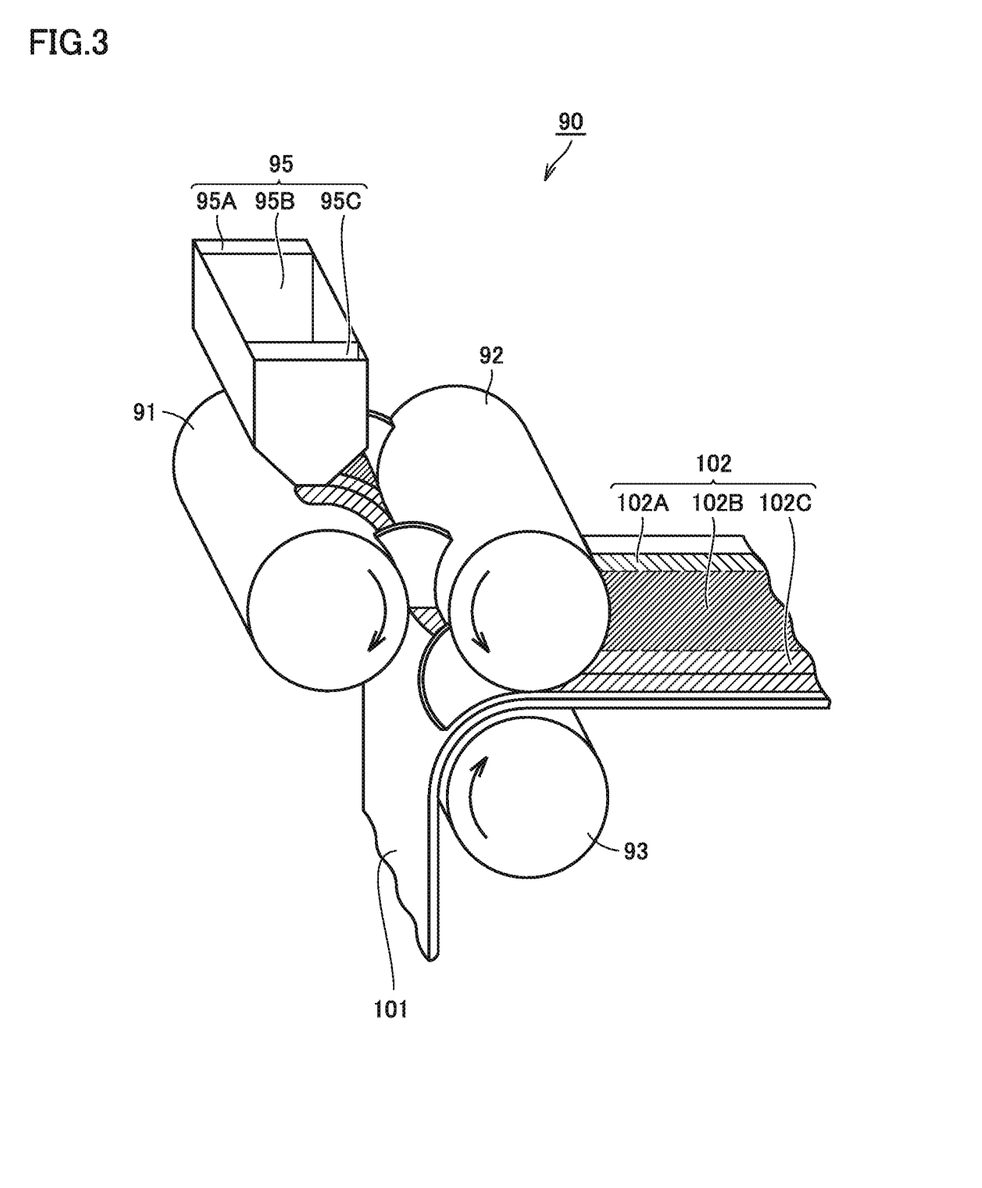
FIG. 3 is a schematic diagram illustrating a disposition step.

FIG. 3 is a schematic diagram illustrating the disposition step. An electrode manufacturing apparatus 90 includes a supply unit 95 and three rolls (an A roll 91, a B roll 92 and a C roll 93). The curved arrow shown on each of the rolls shows the rotation direction of each roll.

Supply unit 95 has an inner space partitioned into a first end supply unit 95A, a center portion supply unit 95B and a second end supply unit 95C. The first granular body containing an aromatic nitrile compound is supplied to first end supply unit 95A and second end supply unit 95C. The second granular body not containing an aromatic nitrile compound is supplied to center portion supply unit 95B.

Supply unit 95 supplies the first granular body and the second granular body into a gap between A roll 91 and B roll 92. The first granular body and the second granular body are supplied to portions corresponding to first end supply unit 95A, center portion supply unit 95B and second end supply unit 95C in the axial direction of A roll 91 or B roll 92. The first granular body and the second granular body are compacted in the gap between the A roll and the B roll, and formed into a sheet shape. Thus, the first granular body and the second granular body are integrated with each other. The weight per unit area (mass per unit area) of the granular body formed in a sheet shape can be adjusted by the gap between the rolls.

Then, the granular body formed in a sheet shape is disposed on the surface of the positive electrode collector. As shown in FIG. 3, positive electrode collector 101 is conveyed on C roll 93, and supplied into a gap between B roll 92 and C roll 93. The positive electrode collector may, for example, be a sheet member made of Al foil or the like. After the first granular body and the second granular body are conveyed out of the gap between A roll 91 and B roll 92, these granular bodies are conveyed on B roll 92 and supplied into the gap between B roll 92 and C roll 93.

The first granular body and the second granular body are pressed against positive electrode collector 101 in the gap between B roll 92 and C roll 93. Then, the first granular body and the second granular body are separated from B roll 92 and pressure-bonded to the surface of positive electrode collector 101. In other words, the first granular body and the second granular body are transferred onto the surface of the positive electrode collector. In this way, the first granular body and the second granular body are disposed on the surface of the positive electrode collector to form a positive electrode mixture layer 102. In other words, the granular body (first granular body) is disposed on the surface of positive electrode collector 101, thereby forming at least a part (both ends) of positive electrode mixture layer 102.

After the granular body is disposed on the positive electrode collector, a drying operation may be performed in order to allow volatilization of the solvent remaining in the granular body. The drying operation is performed, for example, in a hot air drying furnace (not shown) provided on a path line extending after C roll 93. Furthermore, the positive electrode collector having a granular body disposed on one of its surfaces is again supplied to C roll 93, so that the granular body can also be disposed on each of both surfaces of the positive electrode collector.

The granular body disposed on the positive electrode collector serves as a positive electrode mixture layer. Then, a compression operation may be performed in order to adjust the thickness and the density of the positive electrode mixture layer. The compression operation is performed, for example, using a rolling machine.

Lastly, the entire product is cut into a prescribed size, for example, using a slitter or the like, thereby completing a positive electrode 100 shown in FIG. 4, for example.

FIG. 4 is a schematic diagram showing an example of the configuration of a positive electrode. Positive electrode 100 is a strip-shaped sheet member. As shown in FIG. 4, positive electrode mixture layer 102 is formed so as to extend along the surface of positive electrode collector 101 in a longitudinal direction LD. The positive electrode collector has a thickness of about 10 μm to 25 μm, for example. The positive electrode mixture layer has a thickness of about 20 μm to 150 μm, for example.

Positive electrode mixture layer 102 is formed of three portions corresponding to units (first end supply unit 95A, center portion supply unit 95B and second end supply unit 95C) partitioned inside supply unit 95. In other words, positive electrode mixture layer 102 is formed to include, in a width direction WD orthogonal to longitudinal direction LD, a center portion 102B, and a first end 102A and a second end 102C with center portion 102B interposed therebetween.

Center portion 102B is formed of the second granular body not containing an aromatic nitrile compound. In other words, center portion 102B is formed so as not to contain an aromatic nitrile compound. First end 102A and second end 102C are formed so as to include the first granular body containing an aromatic nitrile compound. In this way, the first granular body containing an aromatic nitrile compound is locally disposed on each of both ends of the positive electrode mixture layer, so that elution of transition metal can be efficiently suppressed. This is because a particularly large amount of transition metal is eluted on both ends of the positive electrode mixture layer.

In the present embodiment, assuming that the total width of positive electrode mixture layer 102 is defined as W0, the width of first end 102A is defined as W1 and the width of second end 102C is defined as W2, it is preferable that the positive electrode mixture layer is formed so as to satisfy the above-described equation (I). Thereby, the effect of suppressing elution of transition metal can be improved, so that a capacity decrease and a resistance increase can be further suppressed.

In the above-described equation (I), "(W1+W2)/W0× 100" shows the width ratio (percentage) of both ends (the first end and the second end) to the total width of the positive electrode mixture layer. The width ratio to the total width may, for example, be not less than 0.33% and not more than 4.12% or may be not less than 4.12% and not more than 9.56% as long as it is not less than 0.33% and not more than 9.56%. The width (W1) of the first end and the width (W2) of the second end may be the same as or different from each other. It is however preferable that W1 and W2 are the same in consideration of the productivity and the like.

In addition, without providing partitions inside supply unit 95 (see FIG. 3), an entire positive electrode mixture layer may be formed using a granular body containing an aromatic nitrile compound. Also in this case, the granular body is formed such that the aromatic nitrile compound is disposed on the surface of the positive electrode active material, so that the effect of suppressing elution of transition metal is achieved. Furthermore, the center portion may be formed not of a granular body but of a coating material. In this case, it is preferable to use a coating material not containing an aromatic nitrile compound.

The positive electrode manufacturing step has been described in the above. Other steps are not particularly limited as long as the manufacturing method of the present embodiment includes the above-described positive electrode manufacturing step. An example of each step other than the positive electrode manufacturing step will be hereinafter described.

<<Negative Electrode Manufacturing Step (S200)>>

Figure 5:
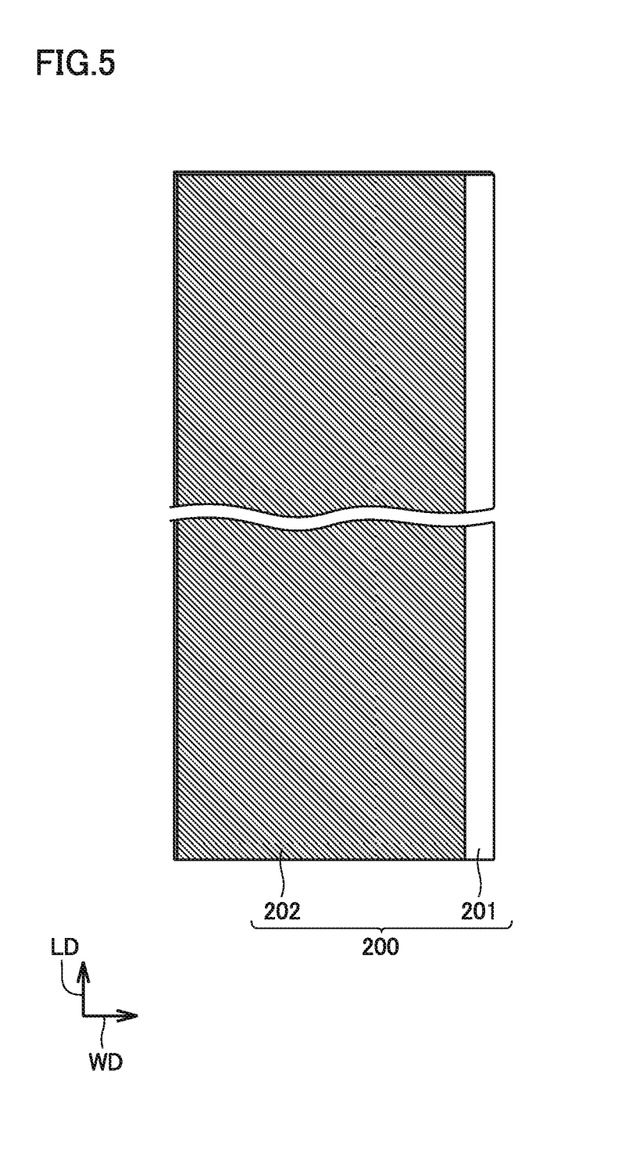
FIG. 5 is a schematic diagram showing an example of the configuration of a negative electrode.

In the negative electrode manufacturing step, for example, a negative electrode 200 shown in FIG. 5 is manufactured. FIG. 5 is a schematic diagram showing an example of the configuration of the negative electrode. Negative electrode 200 is a strip-shaped sheet member. Negative electrode 200 includes a negative electrode collector 201 and a negative electrode mixture layer 202 that is formed on the surface of negative electrode collector 201. The negative electrode collector may, for example, be a sheet member made of copper (Cu) foil or the like. The negative electrode collector has a thickness of about 5 μm to 25 μm, for example. The negative electrode mixture layer has a thickness of about 20 μm to 150 μm, for example.

First, a negative electrode mixture containing a negative electrode active material is prepared. The negative electrode mixture may be prepared as the above-mentioned granular body, or may be dispersed into a solvent and prepared as a paste.

For example, a prescribed mixing apparatus is used to knead a negative electrode active material, a thickening agent, a binder and the like in the solvent, so that a paste-like negative electrode mixture (which will be hereinafter referred to as a "negative electrode mixture paste") can be prepared. For example, water or the like can be used as a solvent of a paste.

The negative electrode mixture is prepared so as to contain, for example, about 95% by mass to 99% by mass of negative electrode active material. The negative electrode active material may be a carbon-based negative electrode active material such as graphite, soft (graphitizable) carbon, hard (hardly-graphitizable) carbon, and the like, or may be an alloy-based negative electrode active material containing silicon (Si), tin (Sn) and the like.

The negative electrode mixture is prepared so as to contain, for example, about 0.5% by mass to 2.5% by mass of thickening agent. The thickening agent may, for example, be carboxymethylcellulose sodium (CMC-Na), sodium polyacrylate (PAA-Na), polyvinyl alcohol (PVA), and the like.

The negative electrode mixture is prepared so as to contain, for example, about 0.5% by mass to 2.5% by mass of binder. The binder may, for example, be styrene-butadiene rubber (SBR), acrylonitrile-butadiene rubber (NBR), PTFE, and the like.

After a negative electrode mixture paste is prepared, this negative electrode mixture paste is coated on the surface of the negative electrode collector and dried, thereby forming a negative electrode mixture layer. The negative electrode mixture paste can be coated, for example, using a die coater, a gravure coater, and the like. Then, the negative electrode mixture layer is compressed, for example, using a rolling machine and cut into a prescribed size using a slitter or the like, so that a negative electrode can be manufactured.

<<Electrode Assembly Manufacturing Step (S300)>>

Figure 6:
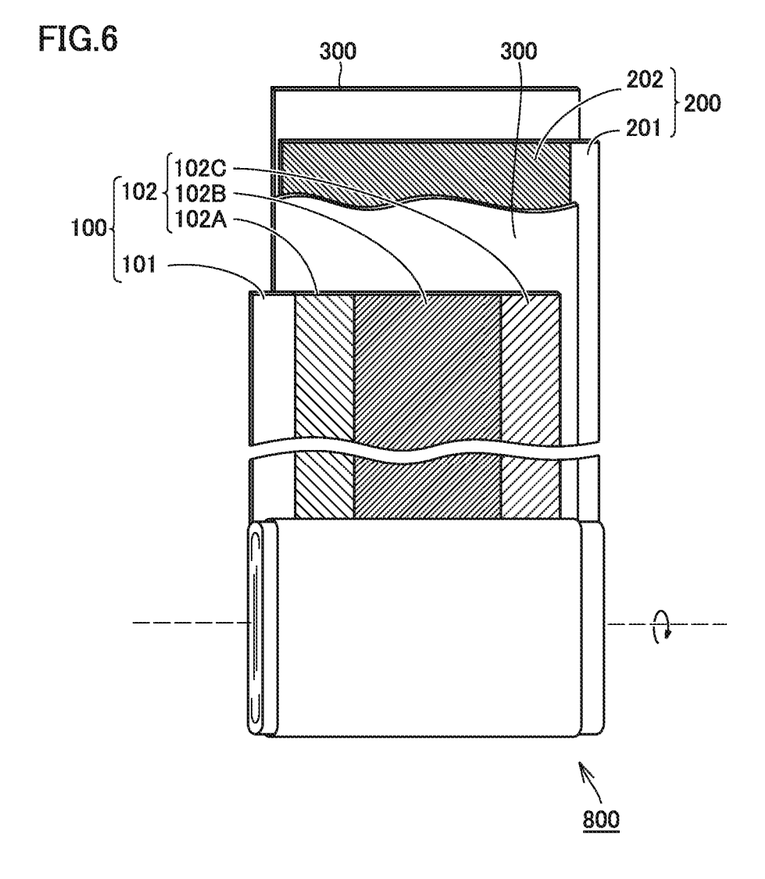
FIG. 6 is a schematic diagram showing an example of the configuration of an electrode assembly.

In the electrode assembly manufacturing step, an electrode assembly is manufactured using a positive electrode and a negative electrode. FIG. 6 is a schematic diagram showing an example of the configuration of an electrode assembly. An electrode assembly 800 shown in FIG. 6 is a winding-type electrode assembly. Electrode assembly 800 can be manufactured, for example, by using a prescribed winding device to stack positive electrode 100 and negative electrode 200 with a separator 300 interposed therebetween and further wind this stack. After electrode assembly 800 is wound, it is press-formed such that its outer shape is formed in a flat shape. This press forming is performed, for example, using a flat-plate pressing machine or the like.

The separator may be a microporous film formed, for example, of polyolefin-based resin such as polyethylene (PE) and polypropylene (PP) and the like. The separator may be formed of a single layer or of a plurality of layers. For example, the separator may be a single layer formed of a microporous film made of PE, or may have a three-layer structure formed by stacking a microporous film made of PE and a microporous film made of PP so as to be arranged in the order of PP/PE/PP. The separator may have a heat-resistant layer provided on its surface. The heat-resistant layer is made, for example, of an inorganic filler such as alumina, a heat resistant resin such as aramid, and the like. The separator has a thickness of about 5 µm to 30 µm, for example.

<<Case Housing Step (S400)>>

Figure 7:
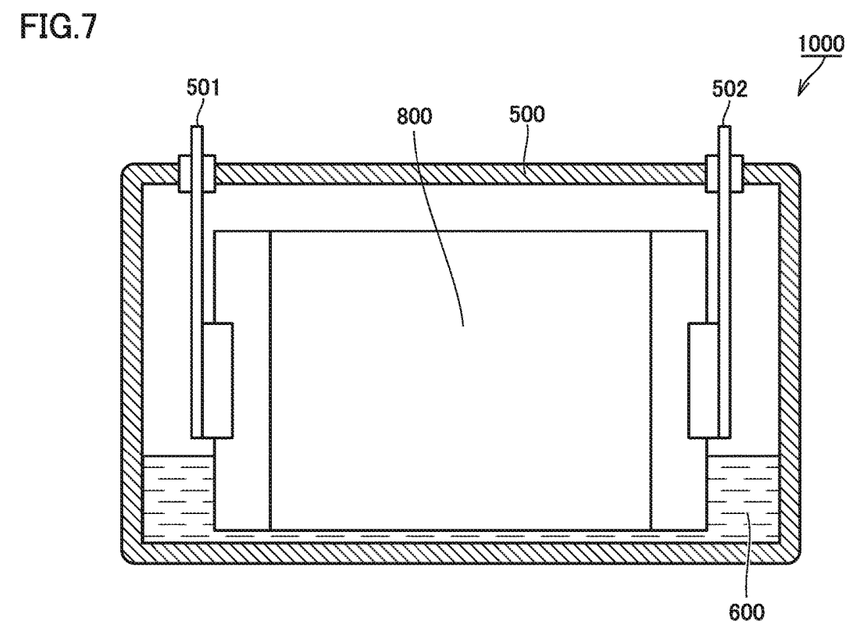
FIG. 7 is a schematic cross-sectional view showing an example of the configuration of a non-aqueous liquid electrolyte secondary battery.

In the case housing step, the electrode assembly is housed in a battery case. FIG. 7 is a schematic cross-sectional view showing an example of the configuration of a non-aqueous liquid electrolyte secondary battery. For example, as shown in FIG. 7, electrode assembly 800 is housed in a battery case 500. In this case, electrode assembly 800 is connected to external terminals 501 and 502 provided in battery case 500.

Battery case 500 shown in FIG. 7 is a prismatic battery case. Battery case 500 is typically formed of: a case body having a bottom; and a lid. Battery case 500 is made, for example, of aluminum alloy and the like. Although not shown, battery case 500 may be provided with a liquid inlet port, a safety valve, a current interruption device, and the like.

<<Solution Supply Step (S500)>>

In the solution supply step, a liquid electrolyte is introduced into the battery case. A liquid electrolyte 600 can be introduced, for example, through the liquid inlet port (not shown) provided in battery case 500. After introduction, the liquid inlet port is sealed by the prescribed means. Thereby, the battery case is sealed to complete a non-aqueous liquid electrolyte secondary battery 1000.

A liquid electrolyte is a liquid electrolyte obtained by dissolving lithium (Li) salt as a supporting salt in an aprotic solvent. Examples of an aprotic solvent may, for example, be cyclic carbonates such as ethylene carbonate (EC), propylene carbonate (PC), butylene carbonate (BC) and γ-butyrolactone (γBL); and chain carbonates such as dimethyl carbonate (DMC), ethyl methyl carbonate (EMC), and diethyl carbonate (DEC). Two or more types of such aprotic solvents may be combined to obtain a mixed solvent. In the mixed solvent, the volume ratio between cyclic carbonates and chain carbonates may for example be set such that cyclic carbonates:chain carbonates=approximately 1:9 to 5:5. Such a range of the volume ratio can achieve an excellent balance between the electric conductivity and the electrochemical stability.

Examples of Li salt may be $LiPF_6$, $LiBF_4$, $LiClO_4$, $LiAsF_6$, $Li[(FSO_2)_2N]$ (abbreviated as "LiFSI"), $Li[(CF_3SO_2)_2N]$ (abbreviated as "LiTFSI"), $Li[CF_3SO_3]$, and the like. The liquid electrolyte may contain two or more types of Li salts. The concentration of Li salt is, for example, about 0.5 mol/l (mole/liter) to 2.0 mol/l (typically about 0.8 mol/l to 1.2 mol/l).

The liquid electrolyte may contain an additive agent in addition to the above-described ingredients. Examples of additive agent may be Li salt including, as an anion, an oxalate complex such as $Li[(C_2O_4)_2B]$ (abbreviated as "LiBOB"), $Li[(C_2O_4)BF_2]$, $U[(C_2O_4)_2PF_2]$; vinylene carbonate (VC), fluoro ethylene carbonate (FEC), ethylene sulfite (ES), propanesultone (PS), $Li[PO_2F_2]$, cyclohexylbenzene (CHB), biphenyl (BP), and the like.

Although the present embodiment has been described as above with reference to a prismatic battery as an example, the present embodiment is not limited to such a prismatic battery. The present embodiment may be applied to a cylindrical battery, a laminate-type battery, and the like. The electrode assembly is also not limited to a winding type. The electrode assembly may be provided also as a laminate type (also referred to as a "stack type"). As described above, according to the present embodiment, elution of transition metal on both ends of the positive electrode mixture layer in the width direction can be efficiently suppressed. It is considered that Li precipitation at the end of the negative electrode mixture layer in the width direction can also consequently be suppressed. Therefore, the present embodiment is particularly suitable to a non-aqueous liquid electrolyte secondary battery for in-vehicle applications, for which greater importance is placed on Li precipitation resistance (Li precipitation is less likely to occur during charging).

EXAMPLES

<Manufacture of Non-Aqueous Liquid Electrolyte Secondary Battery>

In the manner as described below, a non-aqueous liquid electrolyte secondary battery was manufactured by various manufacturing methods and the battery performance was evaluated.

Example 1

The following materials were prepared.

Positive electrode active material: $LiNi_{1/3}Co_{1/3}Mn_{1/3}O_2$ (to which 0.5 mol % of Zr was added)

Conductive material: acetylene black

Binder: PVDF

Aromatic nitrile compound: Benzonitrile

Solvent: NMP

Positive electrode collector: Al foil (made of an A8021 material and having a thickness of 15 µm).

1. Positive Electrode Manufacturing Step (S100)

1-1. Pre-Mixing Step (S101)

A positive electrode active material and an aromatic nitrile compound were introduced into a mixing vessel of a planetary mixer such that the mass ratio of the aromatic nitrile compound to the positive electrode active material was set at 0.1% by mass. Then, the introduced material and compound were mixed to thereby prepare a mixture.

1-2. Granulation Step (S102)

A conductive material, a binder and a solvent were additionally introduced into a mixing vessel of a planetary mixer and mixed therein, thereby preparing the first granular body. The blending proportion of the solid content of the first granular body was adjusted such that positive electrode active material:conductive material:binder=90:8:2 in a mass ratio. The solvent amount was adjusted such that the solid content ratio of the first granular body was set at 77% by mass. The granular particles contained in the first granular body were composted to achieve a particle size of about 0.2 mm to 3.0 mm.

Furthermore, the second granular body not containing an aromatic nitrile compound was prepared in the same manner as for the first granular body except that the pre-mixing step was not performed.

1-3. Disposition Step (S103)

The first granular body and the second granular body were supplied to electrode manufacturing apparatus 90 shown in FIG. 3, to dispose each granular body on the surface of positive electrode collector 101, thereby forming positive electrode mixture layer 102. The width ratio of both ends to the total width shown in the above-described equation (I)

was adjusted to "0.33%". The center portion does not include the first granular body but includes the second granular body. As described above, the first granular body contains an aromatic nitrile compound while the second granular body does not contain an aromatic nitrile compound. In other words, the center portion was formed so as not to contain an aromatic nitrile compound.

In the same manner as described above, a positive electrode mixture layer was disposed also on the other surface (back surface) of the positive electrode collector, and then further processed into a prescribed size, thereby manufacturing a positive electrode 100 shown in FIG. 4.

2. Negative Electrode Manufacturing Step (S200)

The following materials were prepared.
Negative electrode active material: graphite
Thickening agent: CMC-Na
Binder: SBR
Solvent: water
Negative electrode collector: Cu foil.

A negative electrode active material, a thickening agent, a binder, and a solvent were introduced into a mixing vessel of a planetary mixer and then kneaded therein. Thereby, a negative electrode mixture paste was prepared. The solid content was blended in the negative electrode mixture paste such that negative electrode active material:thickening agent:binder=98:1:1 in a mass ratio.

A die coater was used to coat the negative electrode mixture paste on the surface of the negative electrode collector, which was then dried, thereby forming a negative electrode mixture layer. The negative electrode mixture layer was compressed into a prescribed thickness using a rolling machine, and cut into a prescribed size using a slitter. In this way, a negative electrode 200 shown in FIG. 5 was manufactured.

3. Electrode Assembly Manufacturing Step (S300)

A winding device was used to stack a positive electrode and a negative electrode with a separator interposed therebetween, which were then wound, thereby producing a winding body. This winding body was formed in a flat shape using a flat-plate pressing machine. Thereby, an electrode assembly 800 shown in FIG. 6 was obtained.

4. Case Housing Step (S400)

A prismatic battery case was prepared. As shown in FIG. 7, electrode assembly 800 and external terminals 501, 502 were connected, and electrode assembly 800 was housed in battery case 500.

5. Solution Supply Step (S500)

A liquid electrolyte having the following composition was prepared.
Mixed solvent: [EC:DMC:EMC=3:4:3]
Li salt: $LiPF_6$ (1 mol/l).

A liquid electrolyte was injected through a liquid inlet port provided in the battery case, and the battery case was sealed. A non-aqueous liquid electrolyte secondary battery (rated capacity=4 Ah) according to Example 1 was manufactured by the above-described manufacturing method.

6. Initial Charge/Discharge

Initial charge/discharge was carried out on the following conditions. The unit "C" of a current value used herein shows a current by which the rated capacity of the battery is completely discharged in 1 hour. Also, "CC" shows a constant current, "CV" shows a constant voltage, and "CCCV" shows a constant current-constant voltage scheme.

Charge: CC current=1C, cut voltage=4.1V

Discharge: CC current=1/3C, cut voltage=3.0V

Examples 2 and 3

In Examples 2 and 3, as shown in Table 1, the mass ratio of the aromatic nitrile compound to the positive electrode active material was changed in the pre-mixing step. Furthermore, by changing the partitioning positions within the supply unit of the electrode manufacturing apparatus, the width ratios of both ends to the total width of the positive electrode mixture layer shown in the above-described equation (I) were adjusted to "4.12%" and "9.56%", respectively. In the same manner as in Example 1 except for the above, a non-aqueous liquid electrolyte secondary battery according to each of Examples 2 and 3 was manufactured.

TABLE 1

| | Positive Electrode Manufacturing Step | Note |
|---|---|---|
| Example 1 | Pre-mixing → Granulation → Disposition | The mass ratio of an aromatic nitrile compound to a positive electrode active material was set at 0.1% by mass. |
| Example 2 | Pre-mixing → Granulation → Disposition | The mass ratio of an aromatic nitrile compound to a positive electrode active material was set at 2% by mass. |
| Example 3 | Pre-mixing → Granulation → Disposition | The mass ratio of an aromatic nitrile compound to a positive electrode active material was set at 4% by mass. |
| Comparative Example 1 | Pre-mixing → Granulation → Disposition | An aromatic nitrile compound was not added. |
| Comparative Example 2 | Mixing → Disposition | A granular body was not formed. |
| Comparative Example 3 | Granulation → Addition → Disposition | An aromatic nitrile compound was added after granulation. |
| Comparative Example 4 | Granulation → Disposition | An aromatic nitrile compound was added to a liquid electrolyte. |
| Comparative Example 5 | Pre-mixing → Granulation → Disposition | The mass ratio of an aromatic nitrile compound to a positive electrode active material was set at 5% by mass (exceeding 4% by mass). |
| Comparative Example 6 | Collective Granulation → Disposition | A positive electrode active material, an aromatic nitrile compound, a conductive material, a binder, and a solvent were collectively mixed. |
| Comparative Example 7 | Paste → Coating | A positive electrode mixture was turned into a paste (into a coating material). |

TABLE 1-continued

| | Positive Electrode Manufacturing Step | Note |
|---|---|---|
| Comparative Example 8 | Pre-mixing → Granulation → Disposition | Sulfonate ester was used in place of an aromatic nitrile compound. |

Comparative Example 1

In Comparative Example 1, a positive electrode active material, a conductive material, a binder, and a solvent were mixed without adding an aromatic nitrile compound, thereby preparing a granular body. Electrode manufacturing apparatus 90 shown in FIG. 3 was prepared such that supply unit 95 was not partitioned inside thereof. The granular body was supplied to the electrode manufacturing apparatus, to dispose this granular body on the surface of the positive electrode collector, thereby forming an entire positive electrode mixture layer. In the same manner as in Example 1 except for the above, a non-aqueous liquid electrolyte secondary battery was manufactured. In Comparative Example 1, an aromatic nitrile compound was not used.

Comparative Example 2

In Comparative Example 2, without performing a pre-mixing step, a positive electrode active material, an aromatic nitrile compound, a conductive material, a binder, and a solvent were collectively mixed to thereby prepare a mixture serving as a positive electrode mixture layer. The mixture was prepared such that the mass ratio of the aromatic nitrile compound to the positive electrode active material was set at 2% by mass. In Comparative Example 2, however, the solid content ratio of the mixture was set at 69% by mass, so that a prescribed aggregation did not occur, with the result that a granular body could not be formed. This mixture was supplied to the electrode manufacturing apparatus (in which the supply unit was not partitioned) shown in FIG. 3, thereby forming an entire positive electrode mixture layer. In the same manner as in Comparative Example 1 except for the above, a non-aqueous liquid electrolyte secondary battery was manufactured. In Comparative Example 2, an aromatic nitrile compound was used, but a granular body was not formed. Also in Comparative Example 2, an aromatic nitrile compound was uniformly distributed over the entire positive electrode mixture layer.

Comparative Example 3

In Comparative Example 3, without performing a pre-mixing step, a positive electrode active material, a conductive material, a binder, and a solvent were collectively mixed, thereby preparing a granular body. Then, an aromatic nitrile compound was added to the granular body, and then mixed. The granular body was prepared such that the mass ratio of the aromatic nitrile compound to the positive electrode active material was set at 2% by mass. In the same manner as in Comparative Example 1 except for the above, a non-aqueous liquid electrolyte secondary battery was manufactured. In Comparative Example 3, the manufacturing method does not include a pre-mixing step. Also in Comparative Example 3, the aromatic nitrile compound was uniformly distributed over the entire positive electrode mixture layer.

Comparative Example 4

In Comparative Example 4, an aromatic nitrile compound was added to a liquid electrolyte. The additive amount of the aromatic nitrile compound was set at 2% by mass with respect to the amount of the positive electrode active material contained in the battery. In the same manner as in Comparative Example 1 except for the above, a non-aqueous liquid electrolyte secondary battery was manufactured. In Comparative Example 4, an aromatic nitrile compound was added to a liquid electrolyte.

Comparative Example 5

In Comparative Example 5, the mass ratio of the aromatic nitrile compound to the positive electrode active material was changed to 5% by mass. In the same manner as in Example 1 except that the width ratio of both ends shown in the above-described equation (I) was adjusted to "4.15%", a non-aqueous liquid electrolyte secondary battery was manufactured. In Comparative Example 5, the mass ratio of the aromatic nitrile compound to the positive electrode active material exceeds 4% by mass.

Comparative Example 6

In Comparative Example 6, without performing a pre-mixing step, a positive electrode active material, an aromatic nitrile compound, a conductive material, a binder, and a solvent were collectively mixed, thereby preparing a granular body. In the same manner as in Example 2 and the like, a granular body containing an aromatic nitrile compound was disposed on each of both ends of the positive electrode mixture layer while the second granular body not containing an aromatic nitrile compound was disposed in the center portion. The width ratio of both ends to the total width of the positive electrode mixture layer was adjusted to "4.13%". In Comparative Example 6, the granular body containing an aromatic nitrile compound was locally disposed on each of both ends of the positive electrode mixture layer, but the manufacturing method did not include a pre-mixing step.

Comparative Example 7

In Comparative Example 7, a positive electrode active material, an aromatic nitrile compound, a conductive material, a binder, and a solvent were collectively mixed, thereby preparing a positive electrode mixture paste (a coating material). The mass ratio of the aromatic nitrile compound to the positive electrode active material was set at 2% by mass. The solid content ratio of the positive electrode mixture paste was set at 63% by mass. A die coater was used to coat the positive electrode mixture paste on the surface of the positive electrode collector, which was then dried, thereby forming a positive electrode mixture layer. In the same manner as in Example 1 except for the above, a non-aqueous liquid electrolyte secondary battery was manufactured.

Comparative Example 8

In Comparative Example 8, a granular body was prepared using a sulfonate ester compound (methyl benzenesulfonate) in place of an aromatic nitrile compound. The granular body containing a sulfonate ester compound was disposed on each of both ends of the positive electrode mixture layer, and the second granular body (additive-free product) was disposed in the center portion of the positive electrode mixture layer, so that a positive electrode mixture layer was formed. The width ratio of both ends to the total width of the positive electrode mixture layer was adjusted to "4.1%". In the same manner as in Example 1 except for the above, a non-aqueous liquid electrolyte secondary battery was manufactured.

<Evaluation of Battery Performance>

The performance of each non-aqueous liquid electrolyte secondary battery manufactured by each of the above-described manufacturing methods was evaluated as described below.

1. Measurement of Initial Capacity

On the following conditions, CCCV charge/discharge was carried out to measure the initial capacity (discharge capacity). The results thereof are shown in Table 2. The numerical value shown in each column of the initial capacity in Table 2 is obtained by dividing the initial capacity of the battery by the mass of the positive electrode active material.

CCCV charge: CC current=1C, CV voltage=4.1V, cut current=0.01C

CCCV discharge: CC current=1C, CV voltage=3.0V, cut current=0.01C.

2. High-Temperature Cycle Test (Measurement of Resistance Increase Rate)

On the following conditions, a full-range cycle was performed for 500 cycles.

Test temperature: 60° C.

Charge: CC current=2C, cut voltage=4.1V

Discharge: CC current=2C, cut voltage=3.0V.

After 500 cycles, the post-cycle capacity was measured on the same conditions as those in "1. Measurement of Initial Capacity" described above. The post-cycle capacity was divided by the initial capacity, thereby obtaining a post-cycle capacity retention (percentage). The results thereof are shown in Table 2.

Also, before and after the high-temperature cycle test, IV resistance was measured, and the post-cycle IV resistance was divided by the initial IV resistance, thereby obtaining a resistance increase rate. The results thereof are shown in Table 2.

3. Measurement of Elution Amount of Transition Metal

A battery obtained after the high-temperature cycle test was disassembled, to recover a negative electrode. The negative electrode mixture layer was peeled from the negative electrode collector, to recover a negative electrode mixture. An inductively coupled plasma-atomic emission spectrometer (ICP-AES) was used to measure the amount of transition metal (Co, Ni, Mn, Zr) contained in the negative electrode mixture, that is, the amount of transition metal eluted from the positive electrode. The results thereof are shown in Table 2.

TABLE 2

| | Positive Electrode Mixture Layer | | Evaluation of Battery Performance | | | | |
|---|---|---|---|---|---|---|---|
| | Mass Ratio of Aromatic Nitrile Compound to Positive Electrode Active Material Mass % | (W1 + W2)/ W0 * 100 % | Initial Capacity mAh/g | Initial IV Resistance mΩ | Post-Cycle Capacity Retention % | Resistance Increase Rate — | Transition Metal Elution Amount ppm |
| Example 1 | 0.1 | 0.33 | 168.6 | 20.5 | 88 | 1.04 | 18 |
| Example 2 | 2 | 4.12 | 168.4 | 20.4 | 90 | 1.05 | 14 |
| Example 3 | 4 | 9.56 | 168.7 | 19.8 | 93 | 1.07 | 10 |
| Comparative Example 1 | 0 | 0 | 165.4 | 21.4 | 77 | 1.24 | 113 |
| Comparative Example 2 | 2 | 0 | 167.2 | 23.1 | 83 | 1.15 | 41 |
| Comparative Example 3 | 2 | 0 | 168.1 | 22.8 | 85 | 1.12 | 35 |
| Comparative Example 4 | 2 | 0 | 165.8 | 23.4 | 81 | 1.16 | 43 |
| Comparative Example 5 | 5 | 4.15 | 165.2 | 25.9 | 78 | 1.18 | 32 |
| Comparative Example 6 | 2 | 4.13 | 166.7 | 24.5 | 81 | 1.17 | 42 |
| Comparative Example 7 | 2 | 0 | 167.7 | 24.7 | 73 | 1.18 | 58 |
| Comparative Example 8 | 0 (sulfonate ester 2% by mass) | 4.1 | 168.5 | 22.5 | 89 | 1.12 | 35 |

<Results and Consideration>

According to Tables 1 and 2, in a battery manufactured by the manufacturing method according to each of Examples satisfying the following conditions, the elution amount of transition metal is relatively small, that is, the transition metal elution suppressing effect is relatively significant.

(a) A pre-mixing step of mixing the positive electrode active material and the aromatic nitrile compound in advance is performed.

(b) The mass ratio of the aromatic nitrile compound to the positive electrode active material is not less than 0.1% by mass and not more than 4% by mass.

(c) A granular body is disposed on the surface of the positive electrode collector, thereby forming at least a part of the positive electrode mixture layer.

In the battery manufactured by the manufacturing method according to each of Examples, the capacity decrease is relatively small (the initial capacity is relatively large), the initial resistance is relatively low, the post-cycle capacity retention is relatively high, and further, the post-cycle resistance increase rate is relatively low. It is considered that this is because adverse effects caused by the aromatic nitrile compound could be suppressed by forming the positive electrode mixture layer such that the width ratio of both ends was not less than 0.33% and not more than 9.56%.

In Comparative Example 1, the elution amount of transition metal is relatively large. It is considered that this is because an aromatic nitrile compound was not used.

In Comparative Example 2, the transition metal elution suppressing effect is relatively small. It is considered that this is because the pre-mixing step was not carried out, so that an aromatic nitrile compound was not disposed on the surface of the positive electrode active material. It is also considered that granulation could not be achieved, so that the aromatic nitrile compound tended to be distributed in a more uneven and spotty manner on the surface of the positive electrode active material.

In Comparative Example 3, the transition metal elution suppressing effect is relatively small. It is considered that this is because an aromatic nitrile compound cannot be disposed on the surface of the positive electrode active material even if an aromatic nitrile compound is added after formation of a granular body.

In Comparative Example 4, the transition metal elution suppressing effect is relatively small. It is considered that this is because a coating film originating from an aromatic nitrile compound cannot be selectively formed on the surface of the positive electrode active material if an aromatic nitrile compound is added to a liquid electrolyte.

In Comparative Example 5 in which the ratio of the aromatic nitrile compound to the positive electrode active material is set at 5% by mass, the capacity decrease is relatively large (the initial capacity is relatively small), and the post-cycle resistance increase rate is relatively high. In consideration of the results in Examples 1 to 3, the mass ratio of the aromatic nitrile compound to the positive electrode active material should be not less than 0.1% by mass and not more than 4% by mass.

In Comparative Example 6, the transition metal elution suppressing effect is relatively small. It is considered this is because, when a positive electrode active material, an aromatic nitrile compound, a conductive material, and a binder are collectively mixed, the aromatic nitrile compound cannot be selectively disposed on the surface of the positive electrode active material, so that a uniform coating film is not formed on the surface of the positive electrode active material.

In Comparative Example 7, the transition metal elution suppressing effect is relatively small. It is considered this is because, when a positive electrode mixture is turned into a coating material (into a paste), the aromatic nitrile compound does not adhere onto the surface of the positive electrode active material or, even if this aromatic nitrile compound adheres onto the surface of the positive electrode active material, it flows down from the surface.

In Comparative Example 8, the transition metal elution suppressing effect is relatively small. Like an aromatic nitrile compound, the sulfonate ester compound used in Comparative Example 8 contains an aromatic group. The sulfonate ester compound, however, did not show the same transition metal elution suppressing effect as that of the aromatic nitrile compound. It is considered that this is because the electron donicity of the entire compound varies depending on the difference in electron withdrawing performance between the sulfonate ester structure and the nitrile group.

Although the embodiments of the present invention have been described as above, it should be understood that the embodiments disclosed herein are illustrative and non-restrictive in every respect. The scope of the present invention is defined by the terms of the claims, and is intended to include any modifications within the meaning and scope equivalent to the terms of the claims.

What is claimed is:

1. A method of manufacturing a non-aqueous liquid electrolyte secondary battery including a positive electrode mixture layer containing a lithium-containing transition metal oxide as a positive electrode active material, the method comprising:
   mixing the positive electrode active material and an aromatic nitrile compound such that a mass ratio of the aromatic nitrile compound to the positive electrode active material is not less than 0.1% by mass and not more than 4% by mass, to prepare a mixture;
   mixing the mixture, a conductive material, a binder, and a solvent to prepare a granular body; and
   disposing the granular body on a surface of a positive electrode collector to form at least a part of the positive electrode mixture layer, wherein
   the positive electrode mixture layer is formed so as to extend along the surface of the positive electrode collector in a longitudinal direction,
   in a width direction orthogonal to the longitudinal direction,
   the positive electrode mixture layer includes a center portion, and a first end and a second end with the center portion interposed therebetween,
   the center portion does not contain the aromatic nitrile compound,
   the first end and the second end each contain the granular body, and
   in a case where a total width of the positive electrode mixture layer is defined as W0, a width of the first end is defined as W1 and a width of the second end is defined as W2, the positive electrode mixture layer is formed so as to satisfy an equation (I) below:

$$0.33\% \leq \{(W1+W2)/W0\} \times 100 \leq 9.56\% \quad (I).$$

2. The method of manufacturing a non-aqueous liquid electrolyte secondary battery according to claim 1, further comprising shaping the granular body, wherein the shaped granular body is disposed on the surface of the positive electrode collector to form at least a part of the positive electrode mixture layer.

3. The method of manufacturing a non-aqueous liquid electrolyte secondary battery according to claim 1, wherein the aromatic nitrile compound is a compound expressed by the following chemical formula (i):

$$\text{Ar}-(\text{CN})_n \quad (i)$$

wherein,
   Ar represents an aromatic group that may be substituted,
   CN represents a nitrile group, and
   n is an integer equal to or greater than 1.

4. A method of manufacturing a non-aqueous liquid electrolyte secondary battery including a positive electrode mixture layer containing a lithium-containing transition metal oxide as a positive electrode active material, the method comprising:

mixing the positive electrode active material and an aromatic nitrile compound such that a mass ratio of the aromatic nitrile compound to the positive electrode active material is not less than 0.1% by mass and not more than 4% by mass, to prepare a mixture;
mixing the mixture, a conductive material, a binder, and a solvent to prepare a granular body; and
disposing the granular body on a surface of a positive electrode collector to form at least a part of the positive electrode mixture layer, wherein
the aromatic nitrile compound is a compound expressed by the following chemical formula (i):

$$Ar\text{—}(CN)_n \qquad (i)$$

wherein,
Ar represents an aromatic group that may be substituted,
CN represents a nitrile group, and
n is an integer equal to or greater than 1.

* * * * *